June 19, 1934.      G. W. BAUGHMAN      1,963,732
ELECTRICAL APPARATUS INVOLVING CABLE
Filed May 19, 1932      2 Sheets-Sheet 1
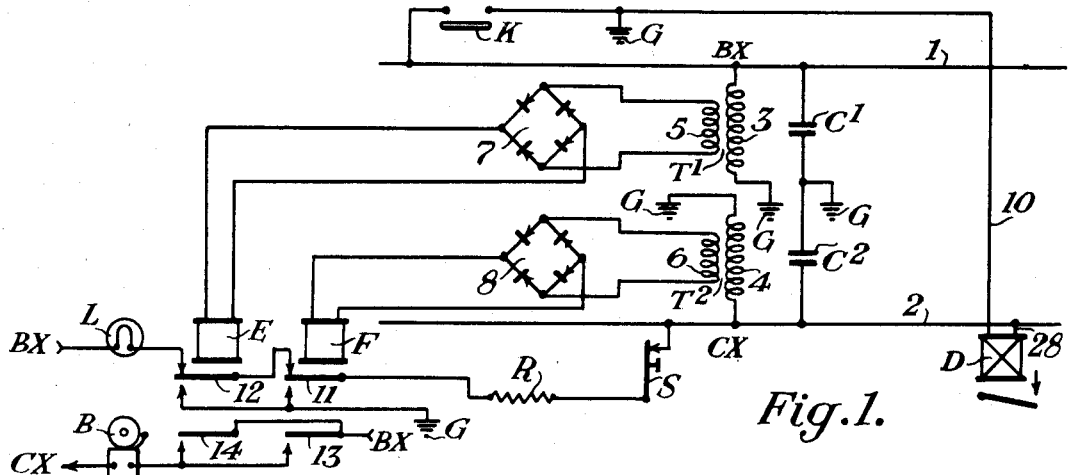
Fig.1.
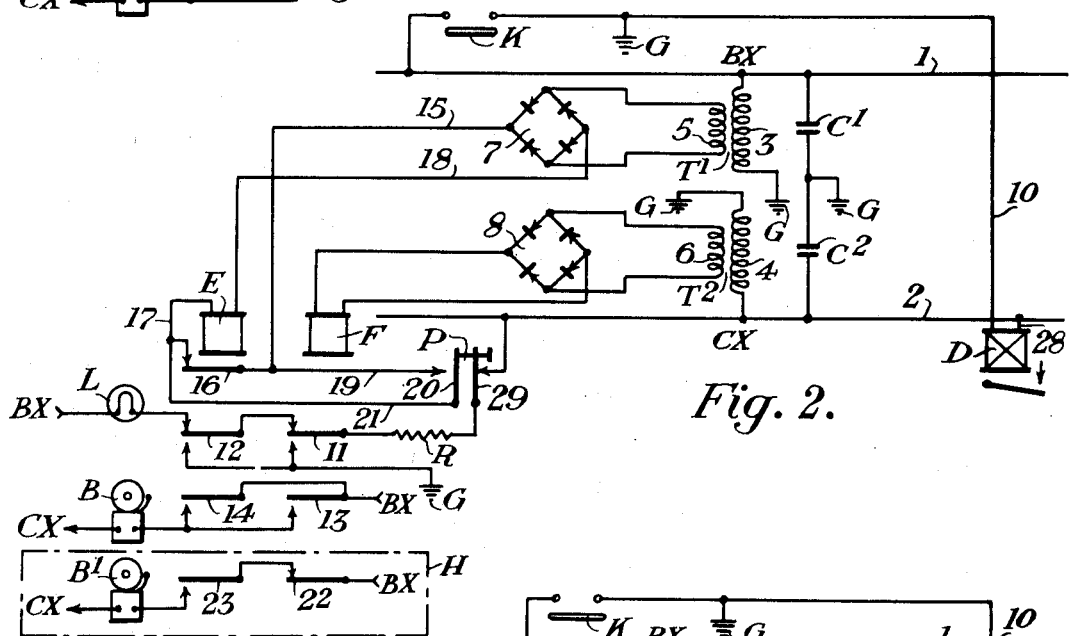
Fig.2.
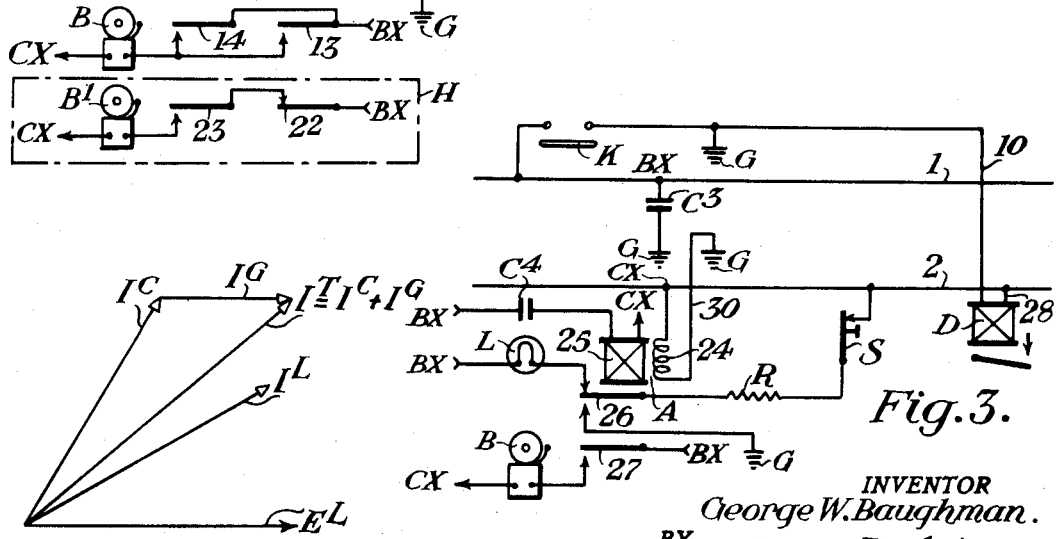
Fig.3.
Fig.4.
INVENTOR
George W. Baughman.
BY
HIS ATTORNEY

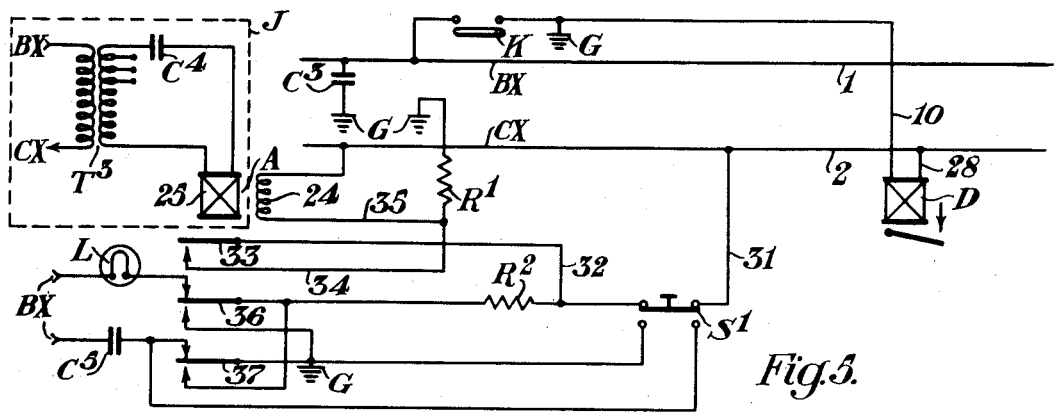
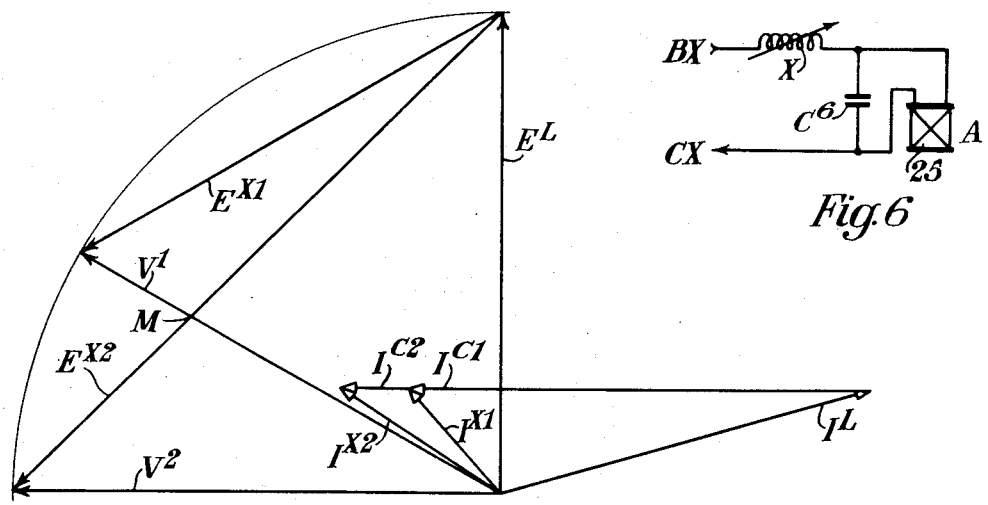
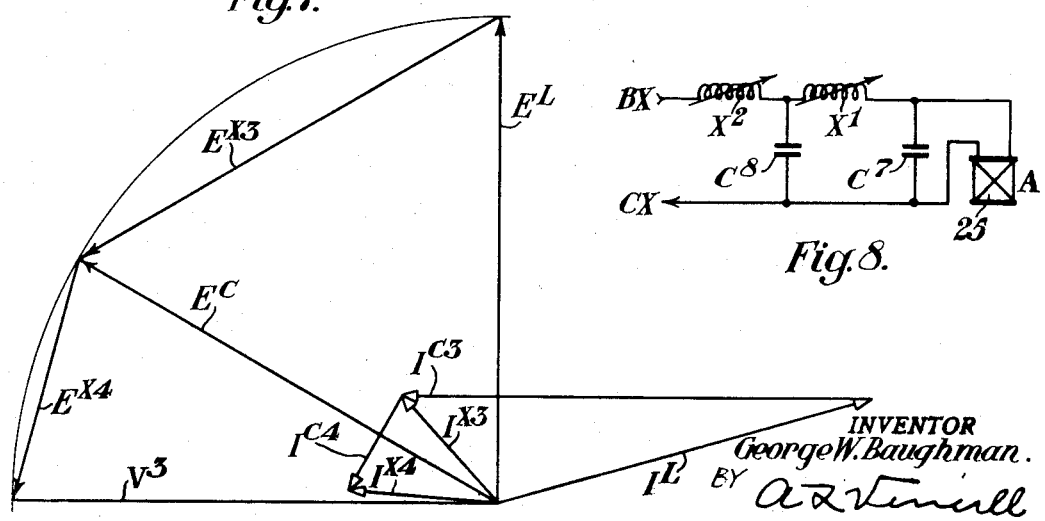
INVENTOR
George W. Baughman.
BY
HIS ATTORNEY

Patented June 19, 1934

1,963,732

UNITED STATES PATENT OFFICE 1,963,732

ELECTRICAL APPARATUS INVOLVING CABLE

George W. Baughman, Pittsburgh, Pa., assignor to The Union Switch & Signal Company, Swissvale, Pa., a corporation of Pennsylvania Application May 19, 1932, Serial No. 612,219

23 Claims. (Cl. 177—311)

My invention relates to electrical apparatus of the type involving cables, and has for an object the provision of means for preventing false operation of a device supplied with power through a cable in the event of a connection between one of the controlling wires and ground. More specifically, my invention has for an object the provision of means for preventing false operation of such a device should a controlling wire as well as one of the power supply wires become grounded simultaneously.

I will describe several forms of apparatus embodying my invention, and will then point out the novel features thereof in claims.

The present application is a continuation of my copending application, filed August 17, 1931, Serial No. 557,482, for Electrical apparatus involving cables, in so far as the subject matter common to the two cases is concerned.

In the accompanying drawings, Fig. 1 is a diagrammatic view showing one form of apparatus embodying my invention. Fig. 2 is a diagrammatic view showing a modification of the apparatus shown in Fig. 1, also embodying my invention. Fig. 3 is a diagrammatic view showing another form of apparatus embodying my invention. Fig. 4 is a vector diagram for the apparatus shown in Fig. 3. Fig. 5 is a diagrammatic view showing a modification of the apparatus of Fig. 3, and embodying my invention. Figs. 6 and 8 show two modifications of a portion of the apparatus illustrated in Fig. 5. Figs. 7 and 9 are vector diagrams for the apparatus shown in Figs. 6 and 8, respectively.

Similar reference characters refer to similar parts in each of the several views.

Referring first to Fig. 1, the reference characters 1 and 2 designate two power wires which are included in a cable. These wires are constantly supplied with alternating current from a source not shown in the drawings. The reference character D designates a relay, one terminal of which is connected with power wire 2 by a wire 28, and the other terminal of which is connected with power wire 1 by a control wire 10 and a circuit controller K. Circuit controller K may either be manually operated or governed automatically by traffic conditions, in well known manner. Governing means for controller K are not shown as they form no part of my present invention.

The capacity between power wire 1 and the ground is indicated by a condenser $C^1$, and the capacity between power wire 2 and the ground is indicated by a condenser $C^2$. It should be understood that these condensers are not present as physical units in the actual apparatus and are shown merely to illustrate the actual electrical conditions which exist in a metal sheathed cable, or a cable having no metallic sheath but buried in the ground or installed in a damp conduit or duct line.

A transformer $T^1$ comprises a primary winding 3 connected from power wire 1 to ground, and a secondary winding 5 connected across the proper diagonally opposite terminals of a full-wave rectifier 7. A similar transformer $T^2$ comprises a primary winding 4 connected from power wire 2 to ground, and a secondary winding 6 connected across the proper diagonally opposite terminals of full-wave rectifier 8. The inductive reactance of transformers $T^1$ and $T^2$ is so chosen that parallel resonance with the respective capacities $C^1$ and $C^2$ is substantially obtained. Protective relays E and F are connected across the proper diagonally opposite terminals of rectifiers 7 and 8, respectively, and serve to actuate an alarm device B when either one or both of these relays are deenergized. Relay E or relay F will become deenergized in the event of a ground occurring on power wire 1 or power wire 2 because under this condition, winding 3 of transformer $T^1$ or winding 4 of transformer $T^2$ will become either wholly or partly short-circuited.

The apparatus thus far referred to is illustrated and described in United States Letters Patent No. 1,748,763, granted to Robert M. Gilson, on the 25th day of February, 1930, for Electrical apparatus involving cables.

The reference character R resignates a resistor which is connected with power wire 2 and which normally includes in its circuit an indicating device such as a lamp L, front contact points of relays E and F and a resetting push button S. With both relays E and F energized, that is, with no ground on either of the power wires 1 or 2, lamp L will be illuminated over a circuit from terminal BX, lamp L, front points of contacts 12 and 11, resistor R, and push button S to the other terminal CX of the source. Should either of the relays E or F release, power wire 2 will be connected with ground through the resistor R over a back point of contact 12 or 11.

I shall now explain the manner in which resistor R functions to provide increased protection against the false energization of relay D should power wire 1 and control wire 10 become grounded simultaneously. It is understood, of course, that a relay such as D controls an important signal or switch function and upon the proper operation of relay D, the safety of railway traffic depends, so that it is of the greatest importance that the hazard of false operation of relay D should be reduced as much as possible.

It has been found that without the auxiliary grounding circuit through resistor R which I provide, highly satisfactory detection of grounds on power wire 1 or 2 is possible. However, at least three conditions may arise in practice which will reduce the protection afforded by the ground detecting apparatus. The first and most serious of these is a simultaneous ground on power wire 1 and control wire 10. Under this condition, it will be apparent that relay D may receive energy over control wire 10 irrespective of the position of controller K, through the ground connection existing between power wire 1 and control wire 10. The ground on power wire 1 will, of course, deenergize relay E so that an alarm will be sounded by bell B, but until such time as wire 1 can be cleared of grounds, a potential source of false operation of relay D will exist. Given the above conditions, according to my invention when relay E releases, wire 2 will be connected with ground through resistor R and if relay D is also grounded, resistor R will form a shunt path around relay D, diverting the greater part of the current away from this relay. The resistance value of resistor R is chosen of such magnitude as compared with the impedance of relay D that the energy received by relay D will be below the pick-up point for this relay unless the grounding path from wire 1 to wire 10 is of very low impedance, bordering on short circuit conditions. When wire 2 becomes grounded through resistor R, relay F will also release, and will remain in the released condition after the system is cleared of grounds until push button S is depressed, permitting relay F to become energized, discontinuing the alarm given by bell B, and illuminating lamp L. The lamp L, besides giving a visual indication that the grounds have been cleared, furnishes a check upon open circuits which may exist in resistor R.

Two other conditions under which my invention will provide increased protection against false energization of relay D occur when a short circuit or open circuit takes place in transformer T¹, or a partial short circuit or open circuit occurs in transformer T². Under any of these conditions, resistor R will be effective in providing a shunt path around relay D, should relay D become grounded, and the lamp will be extinguished and an alarm sounded.

In Fig. 2, I have shown an arrangement which provides against a flashing indication being given by lamp L under certain conditions such, for example, as a ground on wire 1 of relatively greater impedance than the resistance of resistor R. Assuming that such a ground occurs, relay E will release, grounding wire 2 through resistor R. As soon as wire 2 becomes grounded, the potential normally existing between wires 1 and 2 will divide in such manner that a greater potential will exist from wire 1 to ground through the grounding impedance than exists from wire 2 to ground through resistor R. Therefore, relay E may pick up before relay F releases, and in picking up may open the grounding circuit for wire 2, repeating the cycle of operation, which results in flashing of lamp L and intermittent sounding of the alarm.

To overcome this condition, I have provided a stick circuit for relay E which can be traced from one terminal of rectifier 7, wire 15, front contact 16 of relay E, wire 17, winding of relay E, and wire 18 to the other terminal of rectifier 7. Thus when relay E is once released, it can not again be picked up after the ground is removed except by depressing push button P which closes the pick-up circuit starting at one terminal of rectifier 7, wire 15, wire 19, contact 20 of push button P, wire 21, wire 17, winding of relay E, and wire 18 to the other terminal of rectifier 7. Contact 29 of push button P performs the same function as push button S of Fig. 1 in permitting relay F to pick up after grounds have been cleared.

If the ground occurring on wire 1 is of sufficiently low impedance as compared with the resistance of resistor R, relay E only will release and relay F will remain energized. Such grounds are more serious than those of higher impedance because they are more likely to result in false energization of relay D, and it may prove desirable to use a special alarm to give warning of this more serious condition. To accomplish this result, I have provided the arrangement designated in general by the reference character H, comprising a special alarm device B¹ which will become energized only when relay E is released and relay F is picked up. The circuit for alarm device B¹ is self-explanatory.

Referring now to Fig. 3, I have shown therein two power wires 1 and 2, as before, which supply power to a relay D over a control circuit which includes a control wire 10 and a controller K. As a means for detecting a ground upon power wire 1, I have provided a two-element alternating current relay A comprising a winding 25 which I shall term the local winding and a winding 24 which I shall term the control winding. It will be understood that relay A is of such character that when currents of sufficient magnitude and proper phase displacement flow in windings 25 and 24, relay A will pick up contact arms 26 and 27, but when one or the other of windings 25 and 24 is deenergized or if the currents in said windings are of insufficient magnitude or improper phase displacement, relay A will release contact arms 26 and 27.

The control winding 24 is permanently connected from wire 2 to ground, therefore it will be apparent that should a ground develop on control wire 10, winding 24 will provide a shunt path around relay D in the event that wire 1 becomes grounded at the same time that wire 10 is grounded. The impedance of winding 24 is of sufficiently low magnitude that it diverts the greater portion of any current flowing from wire 1 through the ground path, away from relay D, with the result that relay D will be prevented from picking up in all cases except when very severe grounds occur, bordering on short circuit conditions.

The local winding 25 of relay A is energized through a series condenser C⁴ of such magnitude that winding 25 takes a leading current having a substantial lead angle, as will be noted with reference to the vector diagram of Fig. 4, wherein $I^L$ is the current flowing in winding 25, and $E^L$ is the voltage across winding 25 and condenser C⁴ in series, this voltage being the same as that existing between power wires 1 and 2. Control winding 24 is normally energized over a circuit starting at one terminal BX, capacity C³, ground wire 30, and winding 24 to the other terminal CX of the source. It should be noted that the reference character C³ does not represent a physical condenser unit, but represents the distributed capacity of wire 1 to ground, although in practice it may be found that under certain conditions, additional capacity in the form of a physical condenser unit may be necessary in order to produce sufficient energization of the control winding 24 over the circuit just traced.

Under normal conditions, with no ground on wire 1, the phase relations existing in relay A as indicated by the angle between currents $I^L$ and $I^C$ in Fig. 4, are such that relay A will pick up contact arms 26 and 27. When wire 1 becomes grounded, however, a ground resistance path will exist in multiple with capacity $C^3$ and a current will flow over this path through control winding 24. The component of current which winding 24 will receive as a result of a ground on wire 1 is represented by $I^G$ on the vector diagram of Fig. 4, and this component is drawn substantially parallel with $E^L$ because the ground path may be considered practically non-inductive. The total current received by winding 24 under this condition will be $I^T$ which is the sum of currents $I^C$ and $I^G$, and as will be apparent from Fig. 4, the angle between $I^L$ and $I^T$ is substantially smaller than the angle between $I^L$ and $I^C$, so that even though $I^T$ is somewhat greater in magnitude than $I^C$, the reduction in phase angle as a result of a ground on wire 1 is sufficient to cause relay A to release. When relay A releases, a resistor R of relatively low resistance as compared with the impedance of relay D is connected from wire 2 over the back point of contact 26 to ground, so that in the event of a simultaneous ground on control wire 10 and power wire 1, two shunt paths of low impedance exist, one through winding 24 and another through resistor R, for diverting the current away from relay D. Resistor R serves the additional purpose of providing a shunt path around relay D in the event of an open circuit in winding 24. When relay A releases, lamp L becomes extinguished and a warning is given by alarm device B. After the ground on wire 1 has been removed, depressing push button S momentarily will open the shunt path around relay D which includes resistor R, so that relay A will pick up, restoring the apparatus to the condition shown in the drawings.

Referring now to Fig. 5, I have shown therein a modification of the apparatus illustrated in Fig. 3, which is useful in protecting control winding 24 of relay A against the injurious effect of excessive current resulting from a ground of low resistance on the BX line wire. This modification also protects relay A against mechanical injury which might result from high reverse torque developed in relay A in consequence of a ground of the above character.

When a ground occurs, relay A will release, as previously explained in connection with Fig. 3, and the vector diagram of Fig. 4, and winding 24 will become effectively short-circuited by virtue of a circuit starting at line wire CX, wire 31, front contacts of push button $S^1$, wire 32, back contact 33 of relay A, wires 34 and 35, and winding 24, back to line wire CX. Therefore, no appreciable potential will exist across control winding 24, even in the extreme case of a zero resistance ground on line wire BX, consequently there will be no danger of burning out this winding. Resistor $R^1$, which is connected in series with winding 24 to ground, provides a shunt path around relay D, from CX to ground, and this resistor has very little effect on the normal energization of relay A, because in practice it is desirable to select its value quite low as compared with the impedance of capacity $C^3$ through which winding 24 of relay A is energized. When relay A releases, two paths from CX to ground become effective, one over back contact 33 and resistor $R^1$, and the other over resistor $R^2$ and back contacts 36 and 37 in parallel. The purpose of resistor $R^2$ is to provide protection to relay D in the event of an open circuit in resistor $R^1$.

Since it is usually desirable to make the phase angle of currents $I^C$ and $I^L$, of Fig. 4, as small as practicable in order that BX grounds of relatively high resistance may be detected, it will be apparent that when a ground of very low resistance occurs, $I^G$ will be large, and $I^T$ may become swung to the other side of $I^L$, causing reverse torque in relay A. The provision of back contact 33, however, which acts to short circuit winding 24, annuls the torque of relay A under this condition, and provides protection against mechanical injury.

When the impedance of capacity $C^3$ is not sufficiently low to permit winding 24 to be energized satisfactorily when the line is free from grounds, this capacity can be supplemented by an additional condenser $C^5$ connected to ground in multiple with capacity $C^3$ over front contact 37 of relay A. The purpose of connecting condenser $C^5$ over front contact 37 is to prevent a solid BX ground from being maintained, in the event that this condenser should break down. Should a short-circuit develop in condenser $C^5$, relay A will release, and the defective condenser will be disconnected from ground by front contact 37. The back contacts on push button $S^1$ are provided for the purpose of connecting condenser $C^5$ to ground during the pick-up interval of relay A, and after relay A is picked up, push button $S^1$ may be released because, front contact 37 being closed, condenser $C^5$ will thereafter be effective in keeping relay A energized.

In order to make it possible to adjust the energization of relay A very accurately, for the purpose of obtaining sensitive ground detection, I have provided a transformer $T^3$ for supplying the local winding 25 of relay A with energy. By making use of the adjustable taps on the secondary of transformer $T^3$, the energy level in winding 25 can be adjusted very accurately, thereby adapting the relay for use with installations having various values of distributed capacity $C^3$.

Referring to Fig. 6, the circuit arrangement therein disclosed shows a modification of the method for supplying energy to the local winding 25 of relay A, as illustrated in Fig. 5, and takes the place of the apparatus within the rectangle J, of Fig. 5. The principle of operation on which Fig. 6 is based, is that instead of adjusting the magnitude of the voltage which is supplied to winding 25, as in Fig. 5, in order to take care of different values of distributed capacity $C^3$ in different installations, the phase angle of the current in winding 25 is changed, according to the magnitude of capacity $C^3$, to obtain uniform sensitivity of ground detection, irrespective of the magnitude of $C^3$, and to obtain certain additional advantages, not present in the arrangement of Fig. 5.

In Fig. 5, assuming capacity $C^3$ to be 3 microfarads, for example, the voltage across winding 25 would be adjusted to that value which would produce normal torque in relay A. If, however, capacity $C^3$ were to be 6 microfarads, a much lower value of voltage across winding 25 would be required to produce the same normal torque, due to the increased energization of winding 24 under the latter condition. Since, in order to release relay A when a ground occurs, the angle between the local and control currents must be reduced to some definite value, such as 15 degrees, for example, in either instance, it will be apparent that a ground of lower resistance will be required for release when $C^3$ is 6 microfarads, than when $C^3$ is 3 microfarads. In other words, the ability of relay A to detect grounds will be dependent upon the value of normal capacity from BX to ground, and approximately twice as large a value of ground resistance may be detected when $C^3$ is 3 microfarads as when $C^3$ is 6 microfarads.

By shifting the phase angle of the local current, as in Fig. 6, the operating angle of relay A would be made much smaller with $C^3$ having a value of 6 microfarads, than if $C^3$ were 3 microfarads. Therefore, the larger control current in the former case would need to be changed through a smaller angle to produce release, than would the smaller current in the latter case, and it will be apparent that this method will provide practically uniform sensitivity of ground detection in installations with large values of BX capacity to ground, as well as in installations with low values of such capacity.

A further advantage inherent in the arrangement of Fig. 6 is that a remote source of failure of relay A to indicate a BX ground is removed. For example, considering the arrangement of Fig. 5, if condenser $C^4$ should become short-circuited at the same time that a BX ground occurred, relay A would have positive torque, and would fail to release, thus giving no indication of the fault. This condition would not result in the loss of protection to relay D, because this relay would be shunted by winding 24 and resistor $R^1$ in series, but the failure would, nevertheless, not be detected. Either the failure of condenser $C^4$, or the BX ground, acting alone, would be detected, in the release of relay A, and the second failure occurring subsequently would not cause relay A to pick up because winding 24 would be shunted by back contact 33. However, if push button $S^1$ were to be depressed after the second fault occurred, relay A would pick up due to the positive torque, in spite of the BX ground, and fault in condenser $C^4$. By shifting the local current approximately 180 degrees from the position which it occupies in the vector diagram of Fig. 4, as will presently be described in connection with the vector diagram of Fig. 7, the positive torque of relay A under the double fault condition referred to above is eliminated, and fault detection is obtained.

In the vector diagram of Fig. 7, which represents the voltage and current conditions existing in the apparatus of Fig. 6, $E^L$ is the voltage across winding 25 and $I^L$ is the current in this winding, lagging voltage $E^L$ by an angle determined from the power factor of winding 25. The current $I^{C1}$ flowing in condenser $C^6$ is drawn at 90 degrees leading voltage $E^L$. Assuming that it is desired to obtain a 60 degree shift of $E^L$ with respect to the line voltage $V^1$, and further, that voltages $E^L$ and $V^1$ are to be equal in magnitude, the desired reactor voltage $E^{X1}$ is drawn from the terminus of $E^L$ to a point on the arc of a circle of which $E^L$ is the radius, such that the angle between $E^L$ and $V^1$ will be 60 degrees. The reactor current $I^{X1}$ can now be drawn at an angle with $E^{X1}$ which represents the power factor of reactor X, assumed to be .2 for the present purpose. The intersection of condenser and reactor currents $I^{C1}$ and $I^{X1}$ determines the relative magnitude of each, with respect to the current $I^L$.

The impedance of reactor X and condenser $C^6$, required for the 60 degree shift, can now be determined by dividing the voltages $E^{X1}$ and $E^L$, by the currents $I^{X1}$ and $I^{C1}$, respectively.

By increasing the capacity of condenser $C^6$, keeping reactor X constant, a still greater shift, such for example, as the 90 degree shift involving voltages $V^2$ and $E^{X2}$, and currents $I^{C2}$ and $I^{X2}$ of Fig. 7 can be obtained in precisely the same manner. By using other values of capacity for condenser $C^6$, still other values of shift can be obtained. The range which I have found to be most desirable in practice is between 60 and 90 degrees, and this can be obtained by changes in condenser $C^6$ only, without necessitating any change in reactor X.

Should it be desired to keep condenser $C^6$ fixed at the value required for the 90 degree shift, for example, smaller angles of shift can be obtained by decreasing the value of reactor X. To obtain a 60 degree shift by this method, the line voltage and reactor voltage would terminate at the intersection M of the vectors $V^1$ and $E^{X2}$ of Fig. 7. If a step-up in voltage $E^L$ over the line voltage just mentioned is not desired, a resistor may be connected in series with reactor X. The voltage drop across the resistor will be in phase with the line current, and will change the shift angle but slightly. In this manner, using a fixed condenser, an adjustable reactor and an adjustable resistor, various shift angles may be obtained, and in each instance a voltage equal to the line voltage can be maintained across the winding 25 of relay A.

Referring to Fig. 8, the phase shifting arrangement shown in this figure is a further modification of the apparatus designated by the reference character J in Fig. 5. By using the apparatus of Fig. 8, a comparatively wide range of phase angle shift can be obtained by adjusting reactor $X^2$ only. One very flexible method for obtaining a shift of the local current with respect to the line voltage is to select reactor $X^1$ and condenser $C^7$ of such value as to obtain a 45 degree shift, and then to select reactor $X^2$ and condenser $C^8$ to obtain a further 45 degree shift. Shift angles between 45 and 90 degrees, can then be obtained by adjusting $X^2$ only, and at a 45 degree shift, $X^2$ will be zero. To obtain shift angles between zero and 45 degrees, reactor $X^1$ only need be varied, reactor $X^2$ being zero under this condition.

In the vector diagram of Fig. 9, which illustrates the phase relations existing in the apparatus of Fig. 8, $E^L$ and $I^L$ represent the voltage and current, respectively, of winding 25, drawn at the proper power factor angle. The current $I^{C3}$, flowing in condenser $C^7$ is drawn at 90 degrees leading voltage $E^L$. Voltage $E^{X3}$ across reactor $X^1$ is then drawn from the extremity of vector $E^L$, terminating at a point on the arc of a circle of which $E^L$ is the radius, such that the desired intermediate phase shift is obtained. The vector $E^C$ will then represent the voltage across condenser $C^8$. The current $I^{X3}$ flowing in reactor $X^1$ is drawn at the proper power factor angle with respect to voltage $E^{X3}$. The current $I^{C4}$, flowing in condenser $C^8$ can now be drawn at 90 degrees leading voltage $E^C$. The voltage $E^{X4}$ across reactor $X^2$ is drawn in the same manner as voltage $E^{X3}$, to provide the desired total phase shift of the line voltage $V^3$ with respect to the voltage $E^L$. The current $I^{X4}$, flowing through reactor $X^2$ is drawn at the proper power factor angle with respect to voltage $E^{X4}$. The magnitude of the condensers and reactors of Fig. 8 for a given phase shift can now be determined by dividing the voltage drop across the given unit by the current flowing therein.

Although I have shown in Figs. 6 and 8 but two preferred methods for obtaining a shift of the current in winding 25 with respect to the line voltage, for the purposes set out hereinbefore, it will be understood that my invention is not limited thereby, because numerous other phase shifting methods, obvious to those skilled in the art, can be used with like effect.

Some of the advantages obtainable with apparatus embodying my invention are the following: Improved protection is obtained against false operation of a relay such as D in the event of a control wire for said relay becoming grounded simultaneously with the grounding of one of the power supply wires. Improved protection is also obtained when elements of the ground detecting apparatus such as transformer $T^1$ or $T^2$ become open or short-circuited. A distinctive indication can be given in the case of grounds which are particularly dangerous to the safe operation of the system. A single protective relay such as A may be used instead of two relays, as previously employed, to provide a high degree of protection against false operation resulting from grounds. Relay A is protected against excessive currents and high reverse torque resulting from low resistance grounds occurring on the system. Uniform sensitivity of ground detection is obtainable in installations having high distributed capacity, as well as in those where the distributed capacity is low. Also, protection has been provided against numerous failures or conditions dangerous to the safe operation of relay D, occurring either singly, or in combination.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination, an alternating current transmission line comprising two line wires having capacity to ground, a control relay one terminal of which is at times connected with one wire of said line and the other terminal of which is constantly connected with the other wire of said line, two protection relays one for each wire of said line, means for energizing each protection relay by the potential difference existing between the associated line wire and ground whereby the relay will release if the associated wire becomes grounded, and means responding to the release of either of said protection relays for connecting said other line wire with ground.

2. In combination, an alternating current transmission line comprising two line wires having capacity to ground, a control relay one terminal of which is at times connected with one wire of said line through a control wire and a circuit controller and the other terminal of which is constantly connected with the other wire of said line, two protection relays one for each wire of said line, means for energizing each protection relay by the potential difference existing between the associated line wire and ground whereby the relay will release if the associated wire becomes grounded, a resistor having one terminal connected with said other line wire, and means responding to the release of either of said protection relays for connecting the other terminal of said resistor with ground.

3. In combination, an alternating current transmission line, a control relay one terminal of which is at times connected with one wire of said line through a control wire and a circuit controller and the other terminal of which is constantly connected with the other wire of said line, a transformer for each line wire having its primary connected between such line wire and ground, a protection relay for each transformer supplied with current from the secondary thereof, and means responding to the release of either of said protection relays for connecting said other line wire with ground.

4. In combination, an alternating current transmission line, a control relay one terminal of which is at times connected with one wire of said line through a control wire and a circuit controller and the other terminal of which is constantly connected with the other wire of said line, a transformer for each line wire having its primary connected between such wire and ground, a protection relay for each transformer, one of which is connected directly with the secondary of its transformer, means for connecting the other protection relay with the secondary of its associated transformer through a front contact of said other protection relay, a connection around said front contact including a manually operable circuit controller, and means responding to the release of either of said protection relays for connecting said other line wire with ground.

5. In combination, an alternating current transmission line, a control relay one terminal of which is at times connected with one wire of said line through a control wire and a circuit controller and the other terminal of which is constantly connected with the other wire of said line, and means responsive to a connection between said first line wire and ground for connecting said second line wire with ground, thereby providing a low resistance shunt around said control relay in the event that said control wire is grounded.

6. In combination, an alternating current transmission line, a control relay one terminal of which is at times connected with one wire of said line through a control wire and a circuit controller and the other terminal of which is constantly connected with the other wire of said line, a winding energized from the potential between said line wires through the distributed capacity of said one line wire to ground, and means governed by said winding effective when said capacity is shunted by a ground occurring on said one line wire for connecting said other line wire with ground.

7. In combination, an alternating current transmission line comprising two line wires having capacity to ground, a control relay one terminal of which is at times connected with one wire of said line through a control wire and a circuit controller and the other terminal of which is constantly connected with the other wire of said line; a protection relay having a first winding connected between said second line wire and ground and a second winding connected across said line wires, the connections for said protection relay windings being so arranged that normally the phase angle between the currents therein is sufficient to energize the relay whereas in the event of a ground on the first line wire such phase angle is reduced enough to permit the relay to release; and means responsive to release of said protection relay for connecting said second line wire with ground.

8. In combination, an alternating current transmission line comprising a pair of line wires, a relay having a first winding energized from the potential existing between said wires through the distributed capacity of one of said wires to ground and a second winding energized from the potential existing between said wires, and indicating means governed by said relay in such manner as to provide one indication when said capacity is intact and the phase angle between the currents flowing in said first and second windings is of a given magnitude and to provide another indication when said capacity is shunted by a ground occurring on said one wire and said phase angle is thereby changed.

9. In combination, an alternating current transmission line comprising a pair of line wires, a protection relay, a first winding for said relay connected between one of said wires and ground and energized from the potential between said wires through the distributed capacity of the other of said wires to ground, a second winding for said relay connected between said wires, and means for adjusting the phase relation of the current flowing in said second winding with respect to the voltage between said wires in such manner that normally the phase angle of the currents flowing in said windings is such that said relay assumes its energized condition whereas in the event of a ground on either of said wires said phase angle is changed sufficiently to cause said relay to release, thereby providing an indication of a ground on said line.

10. In combination, a transmission line comprising a pair of line wires having capacity to ground, a control relay one terminal of which is at times connected with the first of said wires through a control wire and the other terminal of which is constantly connected with the second of said wires, a winding, means for energizing said winding through the capacity of said first wire to ground, and means governed by said winding effective when said capacity is shunted by a ground occurring on said first wire for shunting said control relay.

11. In combination, an alternating current transmission line comprising a pair of line wires, a control relay one terminal of which is at times connected with one of said wires through a control wire and the other terminal of which is constantly connected with the other of said wires, a polyphase relay having one winding connected across said two wires through a first capacity and a second winding connected across said two wires through a second capacity and ground in series, a resistor connected with said other wire, and means governed by said polyphase relay effective when a ground occurs on said one wire for connecting said resistor with ground.

12. In combination, an alternating current transmission line comprising two line wires having capacity to ground, a control relay one terminal of which is at times connected with one wire of said line and the other terminal of which is constantly connected with the other wire of said line, a first and a second protection relay for said one and said other line wire respectively, means for energizing said first protection relay by the potential difference existing between said one line wire and ground and for energizing said second protection relay by the potential difference existing between said other line wire and ground whereby the respective relay will release if its associated line wire becomes grounded, means responding to the release of either of said protection relays for connecting said other line wire with ground, an indicator, and means for energizing said indicator effective when and only when said first protection relay is released and said second protection relay is energized.

13. In combination, an alternating current transmission line comprising two line wires having capacity to ground, a control relay one terminal of which is at times connected with one wire of said line and the other terminal of which is constantly connected with the other wire of said line, a first and a second protection relay for said one and said other line wire respectively, means for energizing said first protection relay by the potential difference existing between said one line wire and ground and for energizing said second protection relay by the potential difference existing between said other line wire and ground whereby the respective relay will release if its associated line wire becomes grounded, means responding to the release of either of said protection relays for connecting said other line wire with ground, an indicator; and a circuit for energizing said indicator including a source of energy, a back contact of said first protection relay, and a front contact of said second protection relay.

14. In combination, an alternating current transmission line comprising a pair of line wires, a first winding energized from the potential existing between said wires through the distributed capacity of one of said wires to ground, a second winding energized from the potential between said wires, and means governed by said first and second windings responsive to a change in phase angle of the currents flowing therein for giving an indication when said distributed capacity is shunted by a ground occurring on said one wire.

15. In combination, an alternating current transmission line comprising a pair of line wires, a winding one terminal of which is connected with one wire of said line, a resistor connected from the other terminal of said winding to ground whereby said winding becomes energized from the potential between said wires through said resistor and the distributed capacity existing between the other wire of said line and ground, a control relay one terminal of which is constantly connected with said one wire and the other terminal of which is at times connected with said other wire, and means governed by said winding effective when said capacity becomes shunted by a ground occurring on said other wire for connecting said one wire with ground through said resistor.

16. In combination, an alternating current transmission line comprising a pair of line wires, an indicator winding one terminal of which is connected with one wire of said line and the other terminal of which is connected with ground whereby said winding becomes energized from the potential between said wires through the distributed capacity existing between the other wire of said line and ground, and means governed by said winding effective when said capacity becomes shunted by a ground occurring on said other wire for providing an indication and for short circuiting said winding.

17. In combination, an alternating current transmission line comprising a pair of line wires, a winding one terminal of which is connected with one wire of said line and the other terminal of which is connected with ground through a first resistor whereby said winding becomes energized from the potential between said wires through said first resistor and the distributed capacity existing between the other wire of said line and ground, a control relay one terminal of which is constantly connected with said one wire and the other terminal of which is at times connected with said other wire, a second resistor, and means governed by said winding effective when said capacity becomes shunted by a ground occurring on said other wire for connecting said one wire with ground through said second resistor and for connecting the other terminal of said winding with said one wire.

18. In combination, an alternating current transmission line comprising a pair of line wires, a protection relay, a first winding for said protection relay connected from one of said wires to ground whereby said first winding becomes energized from the potential between said wires through the distributed capacity existing between the other wire of said line and ground, a second winding for said protection relay energized from the potential between said wires, and means including a condenser connected across said second winding and a reactor connected in series with said condenser and second winding combination for adjusting the phase relation of the current flowing in the second winding with respect to the voltage between said wires in such manner that normally the phase angle of the currents flowing in said first and second windings is such that said relay assumes its energized condition whereas in the event of a ground on either of said wires said phase angle is changed sufficiently to cause said relay to release, thereby providing an indication of said ground.

19. In combination, an alternating current transmission line comprising a pair of line wires, a protection relay, a first winding for said protection relay connected from one of said wires to ground whereby said first winding becomes energized from the potential between said wires through the distributed capacity existing between the other wire of said line and ground, a second winding for said protection relay energized from the potential between said wires; and means for adjusting the phase relation of the current flowing in said second winding with respect to the voltage between said wires in accordance with the magnitude of said distributed capacity whereby said relay will develop substantially the same torque when said distributed capacity is large as when said distributed capacity is small, said torque being sufficient to pick up said relay under normal conditions and said torque being decreased sufficiently to release said relay in the event of a ground on either of said wires, thereby providing an indication of said ground.

20. In combination, an alternating current transmission line comprising a pair of line wires, a protection relay, a first winding for said protection relay connected from one of said wires to ground whereby said first winding becomes energized from the potential between said wires through the distributed capacity existing between the other wire of said line and ground, a second winding for said protection relay energized from the potential between said wires, and means for adjusting the phase angle between the currents flowing in said first and second windings to suit the magnitude of said distributed capacity in such manner that normally said relay will be picked up whereas a ground of a predetermined value of resistance on said other wire will cause said relay to release, thereby providing an indication of said ground.

21. In combination, an alternating current transmission line comprising a pair of line wires, a protection relay, means for energizing said protection relay from said line through the distributed capacity of one wire of said line to ground whereby said relay will release thereby providing an indication in the event that said distributed capacity becomes shunted by a ground on said one wire, and a condenser having one terminal connected with said one wire and having the other terminal connected with ground over a front contact of said relay for providing a path in multiple with said distributed capacity to thereby lower the impedance in the energizing path of said relay for increasing the energization of said relay when said one line wire is free from grounds.

22. In combination, an alternating current transmission line comprising a pair of line wires, a protection relay, means for energizing said protection relay from said line through the distributed capacity of one wire of said line to ground whereby said relay will release thereby providing an indication in the event that said distributed capacity becomes shunted by a ground on said one wire, a condenser having one terminal connected with said one wire and having the other terminal connected with ground over a front contact of said relay for providing a path in multiple with said distributed capacity to thereby lower the impedance in the energizing path of said relay for increasing the energization of said relay when said one line wire is free from grounds, and manually controlled means for at times connecting said other terminal of said condenser with ground independently of said front contact.

23. In combination, an alternating current transmission line comprising two line wires having capacity to ground, a control relay one terminal of which is at times connected with one wire of said line and the other terminal of which is constantly connected with the other wire of said line, a resistor, two protection relays one for each wire of said line, means for energizing each protection relay by the potential difference existing between the associated line wire and ground whereby the relay will release if the associated line wire becomes grounded, means responding to the release of either of said protection relays for connecting said other wire with ground through said resistor, and means governed jointly by said protection relays for providing an indication in the event that the ground on said one wire is substantially equal to or lower than the value of said resistor.

GEORGE W. BAUGHMAN.